United States Patent [19]
Todd

[11] 3,874,921

[45] *Apr. 1, 1975

[54] WELDABLE PRIMER COMPOSITIONS AND PROCESSES EMPLOYING SAME

[76] Inventor: Judson P. Todd, 943 16th E., Seattle, Wash. 98105

[22] Filed: June 17, 1969

[*] Notice: The portion of the term of this patent subsequent to Aug. 29, 1984 has been disclaimed.

[21] Appl. No.: 834,155

Related U.S. Application Data

[63] Continuation-in-part of Ser. No. 614,003, Feb. 6, 1967, abandoned, which is a continuation-in-part of Ser. No. 479,342, Aug. 12, 1965, abandoned, which is a continuation-in-part of Ser. No. 193,874, May 10, 1962, abandoned.

[52] U.S. Cl. .................. 117/227, 117/49, 117/50, 117/104 R, 117/105, 117/230, 219/137, 260/41 B, 252/500, 252/512, 252/519
[51] Int. Cl. ........................ B44d 1/18, H01b 1/00
[58] Field of Search ............ 117/227, 131, 100, 49, 117/50, 105, 104 R, 230; 106/14, 193 M; 260/41 BC; 219/92, 137, 91; 252/500, 252/512, 519

[56] References Cited
UNITED STATES PATENTS

| | | | |
|---|---|---|---|
| 2,941,894 | 6/1960 | McAdow | 106/193 M |
| 3,339,058 | 8/1967 | Todd | 117/160 R |

OTHER PUBLICATIONS
Lee et al., Epoxy Resins, 1957, p. 266, 272 and 273.
Shell Technical Bulletin, 10/25/61, p. 1–4.

*Primary Examiner*—Cameron K. Weiffenbach
*Attorney, Agent, or Firm*—Graybeal, Barnard, Uhlir & Hughes

[57] ABSTRACT

Weldable primer compositions for steel plate and the like, comprising a resin constituent, aluminum powder, an inorganic oxide coloring constituent capable of exothermically reacting with the aluminum powder at welding arc temperatures, and a solvent-diluent, the compositions being applied by spraying, the primer compositions being fast drying and being capable of welding by low hydrogen welding rod without prior primer coating removal and without weldment degradation. The resin constituent is characterized by a low hydroxyl content and is selected from the group consisting of prepolymerized phenoxy resins and mixtures thereof with a minor amount of a thermoplastic, catalytically polymerized, hydrocarbon resin selected from the group consisting of highly aromatic petroleum resins and terpene phenolic resins. The aluminum powder has a particle size predominantly less than about 325 mesh, and functions as a pigment, corrosion inhibitor, electrical conductor, exothermic reactant, and deoxidizer, present in a ratio of from about 1:100 to about 1:1, and preferably from about 1:40 to about 1:1, by weight of the resin constituent. The inorganic oxide coloring constituent and exothermic reactant is selected from the group consisting of iron oxide and chromium oxide, either of which provides a distinctive color coding to the primer as applied, and is capable of reacting with the aluminum powder in the area of the weld melt to promote essentially complete combustion of the primer coat resin constituent along the weld and to form $Al_2O_3$ which in turn performs a beneficial fluxing action. Other constituents are includable in the primer compositions, such as corrosion inhibitors (calcium-amino chromate having been found to be especially effective in this regard) and inert fillers such as mineral powder (i.e. talc), lamp black, thickening agents such as bentonite, and grinding aids.

27 Claims, No Drawings

WELDABLE PRIMER COMPOSITIONS AND PROCESSES EMPLOYING SAME

CROSS REFERENCE TO RELATED APPLICATIONS

This application is a continuation-in-part of my now abandoned application Ser. No. 614,003, filed Feb. 6, 1967, and entitled Weldable, Low Hydroxyl Primer Compositions and Processes Employing Same, which is in turn a continuation-in-part of my now abandoned application Ser. No. 479,342, filed Aug. 12, 1965, and entitled Weldable Primer Compositions and Processes Employing Same, which is in turn a continuation-in-part of my now abandoned application Ser. No. 193,874, filed May 10, 1962, and entitled Steel Priming Composition and Method.

My application Ser. No. 479,347 entitled Method of Priming and Welding Steel, was also filed Aug. 12, 1965, as a continuation-in-part of my said now abandoned application Ser. No. 193,874, and was issued as U.S. Pat. No. 3,339,058 on Aug. 29, 1967.

BACKGROUND OF THE INVENTION

1. Field of the Invention

The present invention relates to the arts of cleaning, priming, storing and welding of steel plates and the like, and more particularly to primer compositions and techniques compatibly providing steel plates and the like having both good weatherability and good weldability characteristics, and also good receptivity with regard to top coating applied to the structures fabricated from the steel.

2. Description of the prior art

In the past it has been common practice in shipyards and other steel fabricating facilities to thoroughly clean steel plates and the like preparatory to fabrication, as by pickling and then applying a corrosion inhibitive primer coating, commonly termed "wash primers". The first successful wash primer, as disclosed in U.S. Pat. No. 2,525,107, was developed for use in the marine field to prevent corrosion and undercutting of the primer film by rust as well as providing a firm anchor for subsequent paint coats. Polyvinyl butyral conventionally forms the basis for such wash primers, which in addition are characterized by the presence of zinc or lead chromate and a phosphoric acid diluent.

For labor-saving reasons it is highly desirable that it be possible to arc weld directly through the primer coat rather than having to first remove it in the proposed weld area. Heretofore this has not been possible without increase in welding time or loss of weld quality, or without porosity in the weld metal, particularly when so-called low hydrogen types of welding electrodes are used. As known, low hydrogen type electrodes are characterized by a minimal moisture content so that as little waster is presented to the weld melt as possible, to avoid the formation of disassociated or ionized hydrogen and thus minimize hydrogen embrittlement of the weldment.

Low hydrogen electrodes prevent underbead cracking due to hydrogen embrittlement, and because of the low penetrating arc, good bead shape, and high quality weld metal obtained with their lime type low moisture coating, they also tend to eliminate cracking in the weld deposit. Their use also eliminates the need for preheating in many cases where such would be required to satisfactory use of conventional electrodes such as American Welding Society EXX10 electrodes, and usually, higher welding speeds can be achieved. Generally speaking, the currents used with the low hydrogen electrodes are higher than those recommended for EXX10 electrodes of the same diameter.

SUMMARY OF THE INVENTION

The present invention aims to provide an improved process and primer whereby steel can be prepared for fabricating in a more expeditious manner and which permits arc welding with low hydrogen electrodes over a primed steel surface without loss of weld deposition, i.e. welding speed, or loss of weld quality, i.e. without inducing weld metal porosity.

As a further object, the invention aims to provide a superior steel primer having fast drying time, excellent bonding qualities, and providing a good adhesion surface for an unusually wide range of paints and synthetic coatings.

It is a further object and advantage of the present invention to provide a weldable priming composition for steel plate and the like wherein the priming composition can be effectively applied as a single coat up to coating thicknesses of about 2 mils, and provides effective corrosion resistance for extended periods of outdoor storage or salt spray exposure, in contrast to certain prior corrosion inhibiting primer compositions and procedures wherein two or more priming coats are necessary to develop comparable corrosion resistance.

It is a further object and advantage of the present invention to provide a primer composition for steel plate and the like, wherein the primer composition does not adversely affect the weldability of the steel and does not generate toxic fumes when a portion of the primer coat is burned by the welding operation.

Yet another object of the present invention is to provide a primer coat for steel plate and the like wherein the primer coat exhibits a substantial degree of flexibility under stress.

Yet another object and advantage of the present invention is to provide primer coating compositions which can be applied by spraying techniques directly to mechanically cleaned steel surfaces and which have effective drying times of about 3 to about 10 minutes under normal temperature and humidity conditions (20°C. and 25% relative humidity). As a related object and advantage, the present invention contemplates cleaning of steel stock and spraying of the primer coat thereon as a continuous operation while the steel stock is being continuously conveyed through a particle blasting type cleaning equipment and adjoining spray booth.

In trades involving volume steel fabrication, such as shipyards, for example, many types of corrosion inhibiting compositions and techniques are known. It is a chronic problem and complaint in such trades that various coating compositions or techniques, although giving excellent results for certain purposes, have characteristics rendering them unsuitable for other purposes or for certain uses. Thus, certain primer compositions, although desirable from the point of view of weatherability, are not desirable or even usable in terms of other requirements or specifications. Considered collectively, various requirements or specifications for primer compositions for steel plate and the like include the following:

a. single component resin system to avoid pre-mix requirements and the spray equipment complications inherent in so-called "two can" resin systems,
b. composition easy to apply by spraying,
c. single primer coating provides adequate weatherability,
d. good adhesion of coating to mechanically cleaned base surface,
e. fast drying time, with avoidance of post-application heating of the coated plate to obtain adequate drying or curing time,
f. good weatherability during outdoor storage, and good salt spray resistance,
g. proper light reflectivity for automatic plate cutting machine (e.g. Telerex),
h. good coating flexibility under stress,
i. no necessity to remove coating prior to welding,
j. no substantial contribution from the primer coating as to hydrogen content to the weldment, and particularly as to the underbead interface between the filler metal and the base metal,
k. no reduction in manual welding speed with low hydrogen rod, as compared with unprimed stock,
l. no macroporosity in weld metal when using low hydrogen type electrode,
m. very little burn back of primer coating (e.g. ¼ to ⅜ inch),
n. no blistering and good corrosion resistance in burn back area,
o. burn back easily removed by brushing prior to repriming,
p. no toxic fumes generated during welding operation,
q. good compatibility with various coding pigments of the oxide type, even to the extent of a beneficial effect on weldability, and
r. good compatibility of the primer with respect to direct application thereon of various types of final coats, notably alkyd, epoxy and various other synthetic resins.

A principal object and advantage of primer compositions of the present invention is to satisfy all of the above requirements or specifications, rather than only some of them, as in the case with prior wash primers used in the steel fabrication trades.

Other objects, advantages and features of the invention will be apparent from the following description of various typical embodiments of the invention.

DESCRIPTION OF THE PREFERRED EMBODIMENTS

According to the present invention, it has been found that the primer composition should have a resin constituent consisting essentially of a prepolymerized phenoxy resin and mixtures thereof with a minor amount of a thermoplastic, highly aromatic, hydrocarbon resin selected from the group consisting of petroleum resins and terpenephenolic resins.

In general, and as known per se, phenoxy resins are categorizable as essentially linear copolymers formed by reaction of bisphenol A and epichlorohydrin, with the following formulation:

wherein $n$ preferably averages at least about 25 and wherein the average molecular weight is at least about 7,000. Phenoxy resins and their characteristics and properties, are extensively discussed in the text entitled "New Linear Polymers", by Henry Lee et al (publ by McGraw-Hill, Inc., 1967) at pp 17–60, which text portion is incorporated herein by reference to more explicitly define the nature of the phenoxy resins employed in the compositional examples subsequently discussed.

The foregoing phenoxy resin formulation shows a notable and important characteristic of these phenoxy resins, namely that the hydroxyl group (—OH) content of this type of resin is about 6% of the weight of the total molecular structure. This is significant from the point of view of the use environment of the present invention in that the low hydroxyl content results in very little if any ionized hydrogen generation from that portion of the primer composition burned in the vicinity of the weld melt, with the consequence that little if any hydrogen embrittlement in the weld metal is contributed by the primer composition. This relatively low hydroxyl content of phenoxy resins compares very favorably, for example, with the relative amount of unreacted hydroxyl groups in polyvinyl butyral, in which the hydroxyl group content is about 19% by weight.

Another significant characteristic of phenoxy resins, of especial advantage in their usage in a weldable primer composition according to the present invention, is that their relatively high molecular weight and linearly polymeric molecular structure provide a single component resin system, the primer composition thus having excellent storage characteristics and a long "pot" life, which avoids the pre-mix requirements and spray equipment complications inherent in epoxy resin systems, wherein the relative lower molecular weight (about 350 to about 4000) requires a second component (catalytic hardener) to realize an adequate drying or curing time, i.e. is so-called "two can" resin system. Stated otherwise, primer compositions of the present invention, employing long chain, high molecular weight, phenoxy resins as the sole or primary resin constituent, are stable in storage and in the coating application equipment, and simply air dry so that with proper selection of solvent-diluent vehicle a fast drying time can be attained without post-spray heating equipment.

Petroleum resin or terpene phenolic resin when used as a portion of the resin constituent (which is done in commercial practice principally to reduce cost), also has the functionally important characteristic of being essentially free of unreacted hydroxyl groups, so of itself does not contribute any hydrogen ion formation in the weld melt.

As indicated the primer composition should be fast-drying for film application by spraying. To this end a fast-drying ketone type solvent and lower molecular weight aromatic hydrocarbon diluent are used as solvent-diluent constituents of the primer composition. Good results are achieved by using acetone or methyl ethyl ketone with toluene, xylene or so-called ethyl-brome-rich (EBR) solvent (marketed by Union Carbide Corporation). In general, the solvent-diluent of

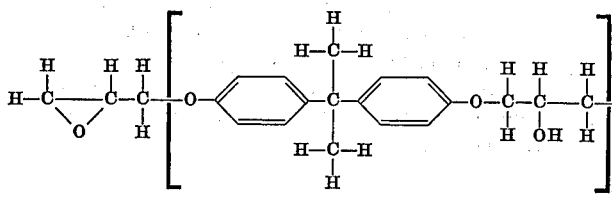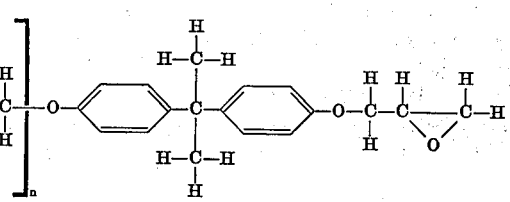

the composition of the present invention can be described as a mixture of a ketone and a relatively low molecular weight aromatic hydrocarbon, which mixture has substantially no hydroxyl groups. The absence of hydroxyl groups is important to practice of the invention, for the same reason that minimal amounts of hydroxyl groups are present in the resin constituent of the primer, i.e. to inhibit as much as possible the formation of ionized hydrogen in the weld melt. Advantageously, the diluent should have a faster evaporation rate than the solvent.

Basic to the primer composition of the present invention is the concept of using a metallic constituent immune to atmospheric degradation and having high electrical conductivity so that a coating of the primer will contribute only negligible electrical resistance for arc welding. I have found that aluminum powder serves well for such a purpose while at the same time contributing significantly as a corrosion inhibitor and deoxidizer. However, rather than using polished leafing aluminum powder as is conventional in aluminum paints, I usually prefer to use a non-leafing low-grease unpolished aluminum powder with the resin constituent. This powder has given excellent results when a size having about a 325 mesh designation (90% through a 325 mesh), a specific gravity of 2.67, and a 0.045 gallon/lb. bulking value. Such a milled aluminum powder is available as "Alcoa Standard Unpolished Powder No. 606", produced by Aluminum Company of America. The aluminum powder to resin ratio by weight can vary from about 1:100 to about 1:1 and preferably can be varied from about 1:40 to about 1:1 and give the requisite electrical conductivity factor, with ratios of about 1:10 to about 1:5 being optimum.

EXAMPLE 1

As a typical example of practice of the present invention, a primer composition was prepared as follows:

| Constituent | Amount |
|---|---|
| Prepolymerized, phenoxy resin (Araldite 488N40 marketed by Ciba Products Co., confer Lee et al text at page 33) | 2.65 lbs. |
| Thermoplastic, catalytically copolymerized, highly aromatic petroleum resin (Velsicol XL 30, marketed by Velsicol Corporation) | 0.45 lb. |
| Aluminum powder (65% suspension of leafing grade polished milled Al powder in toluene carrier, mesh size 95% less than 325 mesh) | 0.25 lb. |
| Coloring pigment and exothermic reactant with the aluminum powder (yellow, red or brown iron oxide or green chromium oxide) | .05 – 0.20 lb. |
| Talc | 2.5 lbs. |
| Expanded clay thickening agent (Bentone 27, marketed by National Lead) | 0.1 lb. |
| Solvent-diluent; 50% acetone- 50% toluene | Sufficient amount to provide one gallon total volume |

As is known, Velsicol XL 30 is a thermoplastic, highly aromatic petroleum resin, having a molecular weight range of about 800–1200, a softening point of 215°–225°F., a specific gravity at 60°F. of 1.04–1.07, and a maximum Iodine value of 100. Petroleum resins in general are defined as low molecular weight hydrocarbon resins which are readily thermoplastic and are derived by catalytic polymerization of deeply cracked petroleum stocks (confer Kirk-Othmer "Encyclopedia of Chemical Technology", 2nd Ed. Vol. 11 (1966), page 248.

Before applying the primer composition to steel members to be primed, the steel members should be thoroughly cleaned of all mill scale, rust, grease, oils and other contaminants. Shot-blasting or sand-blasting has proven most effective for this purpose and is particularly advantageous if the equipment is placed in series with spraying equipment for the primer so that the metal may be continuously fed through both equipments and primer coated immediately after being cleaned. In this way the heat generated during the cleaning operation warms the steel and is utilized to help accelerate drying of the primer. With this arrangement the steel can be cleaned by shot-blasting and primed in a continuous operation in about 3–10 minutes after application and while the steel is moving at about 10 ft/min and with a drying zone of only 30 to 100 ft. depending upon primer thickness (suitably 0.3 to 2 mils and preferably 0.3 to 0.7 mil). Then it can be transferred to either outdoor or indoor storage until needed or can be conveyed directly to the cutting and welding shops for immediate fabrication.

Welding tests with respect to steel members bearing the above primer coat, and using 7018 low hydrogen electrodes demonstrated that the primer coat can be welded through at the same rate as non-primer stock (i.e. about 12–20 feet per minute), and no weld metal macroporosity was discerned in the formed welds. No toxic gases were released by primer coat combustion during the welding operations.

Variation in the amount of inorganic oxide coloring pigment in the above formulation indicated that burning of the primer coat ahead of and laterally of the weld melt progressively improved in direct proportion to the amount of inorganic oxide present, it being apparent in this respect that the aluminum powder and the metal oxide react exothermically at the elevated temperature generated in the weld area and thus promoted essentially complete combustion of the resin constituent and that this exothermic reaction was more pronounced as the amount of metal oxide was increased from 0.05 lb. (20% stoichiometric in relation to the aluminum powder) to 0.20 lb. (80% stoichiometric). It is also theorized that the Al$_2$O$_3$ formed by the exothermic reaction of the metallic oxide with the aluminum particles performs a beneficial fluxing action, contributing to improved weld quality.

For purposes of futher utilization of the formulation of Example 1 in the following Examples (except Example 2), the Example 1 formulation was prepared with 0.125 lb. metal oxide to provide a 50% stoichiometric relationship between the oxide and the aluminum constituents.

Talc is employed in the above formulation simply as an inert mineral filler or extender as is common practice in the preservative coating art. As known, another suitable inert mineral for the purpose is calcium carbonate.

Other experimentation has determined that the primer coat provided by the above primer formulation is compatible with direct application thereover of alkyd, phenolic, epoxy, acrylic, chlorinated rubber, polyurethane and vinyl paints, for example.

EXAMPLE 2

Experimentation omitting the metal oxide constituent the primer formulation resulted in substantial lesser distance between the resin constituent burn line and the molten portion of the weld, by a factor of about 50%, as compared with the Example 1 instances where 0.05 lb. metal oxide was present.

EXAMPLE 3

To demonstrate the suitability of use of other phenoxy resins in primer compositions of the present invention, a formulation was prepared as in Example 1 except that a like amount of Eponol 53-L-32 (marketed by Shell Chemical Co. with 32% solids content by weight in cellosolve acetate solution), was substituted for the Araldite 488N40. This formulation produced excellent primer coatings from the point of view of both weatherability and weldability, its only undesirable characteristic from a commercial point of view being the relatively high cost of this phenoxy resin.

EXAMPLES 4 AND 5

Two additional formulations were prepared, each respectively following the formulations of Examples 1 and 3, except for substitution of ETP-105 terpene phenolic resin in like amount for the Velsicol XL30 petroleum resin. ETP-105, marketed by Pennsylvania Industrial Chemical Corporation (PICCO), is a pure hydrocarbon polyterpene resin of the thermoplastic type, having a specific gravity of 1.03, a softening point (ring and ball) of 105, an acid number of 3, a viscosity (Gardner — 70% methanol) of Q, and a Gardner color reading of 7).

Application of these formulations involving ETP-105 as primer compositions in like manner as in Examples 1 and 3 indicated the ETP-105 was equally useful as the hydrocarbon resin additive and just as effective for this purpose as Velsicol XL30, the only apparent disadvantage of ETP-105 with regard to weatherability being a slight sensitivity of these coatings to deterioration under action of fuel oil. In all cases the formulations demonstrated highly satisfactory weld-through characteristics, with good primer coat burn-off and no adverse effect on weld quality.

EXAMPLES 6 AND 7

To investigate the effect of the nature of the aluminum powder constituent with regard to weatherability and weldability of primer coats, formulations like those in Examples 1 and 3 were prepared utilizing non-leafing grade aluminum powder of like mesh size, in lieu of the leafing grade aluminum powder. In each instance the amount of aluminum powder employed was 0.25 lb. N-3983 non-leafing grade aluminum powder (75% Al and 25% highly aromatic solvent, marketed by Valley Metalurgical Processing Company of Haskell, New Jersey), together with 0.125 lb. yellow iron oxide YLO-1788, marketed by Charles Pfizer & Co., Inc.,) to give a stoichiometric ratio between the inorganic oxide and aluminum powder of about 50%.

Weatherability and weldability tests with these formulations, involving non-leafing aluminum powder, indicate no functional difference between employment of leafing grade aluminum powder and non-leafing grade aluminum powder in formulations characteristic of the invention. In each instance, the electroconductivity of the primer coating and weatherability thereof was not discernibly different. From these tests it is concluded that both the leafing grade aluminum powder and non-leafing grade aluminum powder are equally applicable to compositions and primer coatings formulated in accordance with the invention.

EXAMPLE 8

To demonstrate yet another suitable phenoxy resin and also provide a typical example of commercial practice with respect to preparation of compositions typifying the present invention, this Example outlines the formulation of a current weld-through primer composition as now being marketed by Todd Chemicals Inc., Seattle, a yellow weld-through primer. This composition has the following constituents:

| Material | Lbs. | Gallons |
|---|---|---|
| YLO 1788 yellow iron oxide | 130.0 | 3.88 |
| N3983 non-leafing aluminum powder | 4.0 | .31 |
| Talc inert mineral filler (mesh size less than 325 mesh) | 100 | 4.30 |
| Bentone 27 (bentonite marketed by National Lead Company) | 5.0 | .35 |
| PKHC, phenoxy resin (marketed by Union Carbide Plastics Co.) | 90.0 | 9.15 |
| ETP-105 terpene phenolic resin | 30.0 | 3.49 |
| Nuosperse, an alkyl-phenoxy ethoxy ethanol wetting and dispersing agent and emulsion stabilizer, marketed by Tenneco Chemicals, Inc.) | 4.0 | .5 |
| Methyl ethyl ketone | 124.0 | 20.0 |
| Cellosolve acetate | 40.5 | 5.0 |
| Cellosolve | 135.5 | 17.5 |
| Methyl isobutyl ketone | 100.0 | 15.0 |
| Chevron Solvent 172L (a predominantly xylene solvent marketed by Standard Oil Company of California | 253.7 | 35.0 |
| Total | 1016.7 | 114.48 |

In a typical mixing operation all the resin is dispersed in the cellosolve acetate and cellosolve. The Bentone 27 is then added and the mix stirred until gelled. Then the remaining solids and about half of the ketones and 172L are added while maintaining strong agitation and adequate viscosity to get good dispersion. When dispersion is complete, as indicated by a grind of 5 (on a Gardner fineness of grind gauge), the remaining ketones and 172L are added to complete the batch.

The mixed composition had a weight per gallon of 8.88 pounds and a viscosity of 25–30 sec (No. 2 Zahn).

This primer composition has proven under extensive testing to have highly satisfactory weatherability and weldability properties and the phenoxy resin PKHC in combination with the hydrocarbon resin ETP–105 is considered to provide the optimized resinous material for commercial practice of the invention.

EXAMPLE 9

As another example of commercial practice of the invention, the commercial formulation of olive weldthrough primer marketed by Todd Chemicals, Inc. is as follows:

| Material | Lbs. | Gallons |
| --- | --- | --- |
| YLO 1788 yellow iron oxide | 37.0 | 1.10 |
| Talc inert mineral filler (mesh size less than 325 mesh) | 180.0 | 7.74 |
| Lamp Black coloring constituent | 2.0 | .13 |
| N3983 non-leafing aluminum powder | 4.0 | .31 |
| Bentone 27 (bentonite marketed by National Lead Company) | 5.0 | .35 |
| PKHC, phenoxy resin (marketed by Union Carbide Plastics Co.) | 98.0 | 9.95 |
| ETP-105 terpene phenolic resin | 32.0 | 3.72 |
| Nuosperse, an alkylphenoxy ethoxy ethanol wetting and dispersing agent and emulsion stabilizer, marketed by Tenneco Chemicals, Inc.) | 4.0 | .50 |
| Methyl ethyl ketone | 124.0 | 20.00 |
| Cellosolve acetate | 40.5 | 5.00 |
| Cellosolve | 135.5 | 17.50 |
| Methyl isobutyl ketone | 100.0 | 15.00 |
| Chevron Solvent 172L (a predominantly xylene solvent marketed by Standard Oil Company of California) | 245.0 | 34.00 |
| Total | 1007.0 | 115.30 |

This formulation exhibits a weight per gallon of 8.73 pounds and viscosity of 25-30 sec (No. 2 Zahn), and is the commercial equivalent of the formulation presented in Example 8, the only significant difference being the color thereof.

EXAMPLES 10 – 21

A series of primer composition formulations were prepared and tested to more fully investigate various proportions of aluminum-to-resin and proportions of aluminum-to-metal oxide exothermic reactants, in order to further evaluate minimum effective aluminum content for purposes of adequate electroconductivity and to further evaluate the beneficial effects from the thermite reaction ($2Al-Fe_2O_3 \rightarrow Al_2O_3 + 2Fe +$ 200,000 calories per mol) with regard to extent of primer burn black during welding and with regard to resultant weld quality. The various formulations tested, hereinafter designated Examples 10–21, were applied in the film thicknesses indicated to Class M steel plates which were shot blasted on a Wheelabrator machine just prior to the tests, the coatings being applied by spray painting to simulate commercial application thereof.

The base mixture prepared for these examples comprise the following:

| | | Proportion Per Gallon |
| --- | --- | --- |
| 1. | PKHC phenoxy resin | 1.0 lb. |
| 2. | ETP-105 Terpene hydrocarbon resin | 0.3 lb. |
| 3. | Solvent mixture (by volume) Methyl ethyl ketone 50% Toluene 45% Cellosolve acetate 5% | Balance to make one gallon |

To the above basic mix various amounts of N3983 aluminum powder and various amounts of inorganic oxide pigment were added and each resulting mix was sprayed on two of the steel plates to the film thicknesses indicated, as follows:

| Example | Al | Metal Oxide | Film Thickness | Al/Resin Proportion | Al/Oxide Proportion |
| --- | --- | --- | --- | --- | --- |
| 10 | 0.20 lb/gal | 0.0 lb/gal | 1 mil(s) | 1:6.5 | 0% Stoic. |
| 11 | 0.20 | 0.025 Cr$_2$O$_3$ | 2 | 1:6.5 | 6⅔% |
| 12 | 0.065 | 0.0 | 1.5 | 1:20 | 0% |
| 13 | 0.065 | 0.025 Cr$_2$O$_3$ | 1.5 | 1:20 | 20% |
| 14 | 0.065 | 0.065 Cr$_2$O$_3$ | 1.5 | 1:20 | 50% |
| 15 | 0.065 | 0.130 Cr$_2$O$_3$ | 1.5 | 1:20 | 100% |
| 16 | 0.065 | 0.260 Cr$_2$O$_3$ | 1.5 | 1:20 | 200% |
| 17 | 0.025 | 0.025 Cr$_2$O$_3$ | 1.5 | 1:50 | 50% |
| 18 | 0.025 | 0.050 Fe$_2$O$_3$ | 1.5 | 1:50 | 100% |
| 19 | 0.025 | 0.050 Cr$_2$O$_3$ | 1.5 | 1:50 | 100% |
| 20 | 0.025 | 0.100 Fe$_2$O$_3$ | 1.5 | 1:50 | 200% |
| 21 | 0.025 | 0.100 Cr$_2$O$_3$ | 1.5 | 1:50 | 200% |

The pairs of plates were then welded with one plate in the horizontal position and the matching plate placed on edge in the center of the first plate, with a fillet weld applied at the junction of the two plates on one side only, the welding rod used in each instance being low hydrogen rod No. 7108.

It was notable during this series of tests that the combination of aluminum powder and iron oxide or chromium oxide powder definitely contributed to the extent of primer burn-off ahead of and at the sides of the welding arc. As compared with those examples having no metal oxide present (Examples 10 and 12), this improvement was not readily determinable in the case where the stoichiometric proportion was 6⅔% (Example 11) but proved quite noticeable when the ratio of inorganic oxide to aluminum is 20% stoichiometric (Examples 13–16), with further improvement at 50% stoichiometric (Examples 14 and 17), with still further improvement at 100% stoichiometric (Examples 15, 18 and 19), and with the improvement gained in the 100% stoichiometric examples being directly comparable to that found in the examples containing an excess of the metal oxide (200% stoichiometric in Examples 16, 20 and 21). On the basis of these tests and the stoichiometry of the thermite reaction it is theorized that the inorganic metal oxide reacts with the aluminum up to 100% stoichiometric ratio of oxide to aluminum and that when metal oxide is present in excess of stoichiometric (as in Examples 16, 20 and 21) the excess metal oxide does not react i.e. functions simply as an inert coloring pigment.

During the welding procedure it was noted that even in those examples where the aluminum-to-resin ratio is relatively low (1:50 in Examples 17–21) to electroconductivity of the primer coating was nevertheless adequate to readily initiate the welding arc. From these latter examples it is deduced that when the primer coating contains a sufficient amount of inorganic oxide to provide substantial exothermic reaction of the weld heat, then the proportion of aluminum in relation to the resin content of the composition can be lower and desirably should be lower in the instances where the oxide is to provide a substantial coloring or pigmentation of the primer composition, since the relatively high aluminum content would otherwise tend to mask the pigmentation of the inorganic oxide constituent. Related experimentation has indicated with regard to minimal aluminum-to-resin ratio that ratios as low as 1:100 permit welding arc initiation without serious arc impediment, particularly in formulations involving high aluminum-to-metal oxide ratios, since once the arc is initiated the burn-off of the primer composition proceeds sufficiently ahead of the arc so that no impediment to arc conductivity is presented as the weld melt progresses. Other experimentation with regard to maximal aluminum-to-resin ratios has indicated that above ratios of about 1:1 the composition becomes more difficult to apply in thin coatings and there can be degradation as to adhesion of the primer coating to the steel substrate.

During the course of these tests of Examples 12-21, no excess smoke was produced during the welding operations, and visual examination of the weld areas and the back sides of the plates behind the weld areas show definite improvement in appearance with progressively increasing amounts of inorganic metal oxide up to 100% stoichiometric proportion in relation to the aluminum content, and without observable difference in burn back appearance in those cases where the inorganic metal oxide content was in excess of stoichiometric.

EXAMPLES 22, 23, 24 AND 25

To investigate the efficacy of the chromate type corrosion inhibitor, further primer formulations were prepared which in each respective instance was like the formulations presented in Examples 1, 3, 8 and 9, with addition of EX–1436 Pigment A, a calcium-amino chromate marketed by Chas. Pfizer & Co., Inc., which has a hexavalent Cr content of 21% (expressed in terms of equivalent $CrO_3$) and a water solubility of 0.5 grams $CrO_3$ equivalent in 100 ml water. This organochromate was used in the amount of 1 ounce per gallon of primer composition. Evaluation of these primer coatings as to weatherability and weldability indicated all these formulations had excellent corrosion inhibiting characteristics without any deleterious affect on the primer coating with regard to compatibility of the coating with various alkyd, phenolic, epoxy, acrylic, chlorinated rubber, polyurethane and vinyl top coat applications (compatibility with top coatings being a serious problem commonly encountered with many corrosion inhibitors, including inorganic chromate corrosion inhibitors) and without detracting from the burn back characteristics and quality of the resulting weld.

From the foregoing various further modifications and adaptations of formulations and techniques for utilizing same will occur to those skilled in the art to which the invention is addressed, within the scope of the following claims.

What is claimed is:

1. In combination with a steel structural member having a mechanically pre-cleaned surface, a primer coating whereby the primed steel can be arc welded by means of a low hydrogen welding electrode at high speed with good weld quality and without primer coating removal, such primer coating being further characterized by excellent bonding qualities and the presentation of a good adhesion surface for a wide range of paints and synthetic coatings, the said primer coating after drying comprising a mixture of:
   a. a resinous material consisting essentially of a prepolymerized, self-curing phenoxy resin mixed with a minor amount of thermoplastic, catalytically polymerized hydrocarbon resin selected from the group consisting of aromatic petroleum resins and terpene phenolic resins;
   b. aluminum powder having a particular size at least predominantly less than about 325 mesh and present in a weight ratio of from about 1:40 to about 1:1 relative to the resinous material, said aluminum powder serving as a pigment, corrosion inhibitor, electrical conductor, exothermic reactant, and deoxidizer;
   c. an inorganic oxide powder selected from the group consisting of iron oxide, chromium oxide, and mixtures thereof, and serving as a coloring constituent and exothermic reactant;

said aluminum powder being present in an amount rendering a dried coating of the composition sufficiently electroconductive to enable initiation of a rod welding arc therethrough, and said inorganic oxide being present in the amount of at least 20% by weight relative to the aluminum powder to provide substantial exothermic reaction therewith and promote localized primer burn-off when the primer coating is heated by rod welding arc.

2. The combination of claim 1, wherein the resinous material in the primer coating consists essentially of a mixture of phenoxy resin and petroleum resin.

3. The combination of claim 1, wherein the resinous material in the primer coating consists essentially of a mixture of phenoxy resin and terpene phenolic resin.

4. The combination of claim 1, wherein the primer coating further comprises finely divided mineral powder as an inert filler.

5. The combination of claim 1, wherein the aluminum powder and resinous material in the primer coating are respectively present in weight ratio of from about 1:40 to 1:1.

6. The combination of claim 1, wherein the primer coating further comprises a calcium-amino chromate as a corrosion inhibitor.

7. The combination of claim 1, wherein the inorganic oxide powder, serving as a coloring constituent and exothermic reactant in the primer coating is present at least in an amount sufficient to stoichiometrically react with essentially all of the aluminum powder present in the primer coating.

8. The process of priming steel to place such in a form suitable for extended outside storage and subsequent welding by low hydrogen electrode without prior primer coating removal, said process comprising:
   a. particle-blasting the surface of the steel to clean same;
   b. spraying the surface of the steel with a primer composition to a coating thickness of less than about 2 mils, such priming composition as applied to the steel surface comprising a mixture of:
      1. a resinous material consisting essentially of a prepolymerized, self-curing phenoxy resin mixed with a minor amount of thermoplastic, catalytically polymerized hydrocarbon resin selected from the group consisting of aromatic petroleum resins and terpene phenolic resins;
      2. aluminum powder having a particle size at least predominantly less than about 325 mesh and present in weight ratio of from about 1:40 to about 1:1 relative to the resinous material, said aluminum powder serving as a pigment, corrosion inhibitor, electrical conductor, exothermic reactant, and deoxidizer;
      3. an inorganic oxide powder selected from the group consisting of iron oxide, chromium oxide, and mixtures thereof, and serving as a coloring constituent and exothermic reactant;
      4. a fast drying organic solvent-diluent mixture in which said resinous material is completely soluble, the solvent portion of which at least principally comprises an oxygenated organic solvent characterized by a substantially complete absence of unreacted hydroxyl groups;
   said aluminum powder being present in an amount rendering a dried coating of the composition sufficiently electroconductive to enable initiation of a rod welding arc therethrough, and said inorganic oxide being present in the amount of at least 20% by weight relative to the aluminum powder to provide substantial exothermic reaction therewith and promote localized primer burn-off when the primer coating is heated by rod welding arc; and
   c. air drying the resulting primer coating.

9. The process of claim 8, wherein said resinous material consists essentially of a mixture of phenoxy resin and petroleum resin.

10. The process of claim 8, wherein said resinous material consists essentially of a mixture of phenoxy resin and terpene phenolic resin.

11. The process of claim 8, further comprising finely divided mineral powder as an inert filler.

12. The process of claim 8, further comprising a calcium-amino chromate as a corrosion inhibitor.

13. The process of claim 8, wherein the inorganic oxide powder, serving as a coloring constituent and exothermic reactant, is present at least in an amount sufficient to stoichiometrically react with essentially all of the aluminum powder present.

14. The process of claim 8, wherein the aluminum powder and resinous material are respectively present in weight ratio of from about 1:40 to 1:1.

15. The process of claim 14, further comprising finely divided mineral powder as an inert filler.

16. The process of claim 8, wherein the solvent-diluent is selected from the group consisting of acetone, methyl ethyl ketone, and mixtures thereof, and the diluent is selected from the group consisting of toluene, xylene, and mixtures thereof.

17. The process of claim 16, wherein the solvent and diluent are present in approximately equal proportions.

18. A primer composition for steel enabling arc welding of the steel at high speed and with good weld quality by means of a low hydrogen welding electrode applied directly over a primed steel surface, such primer composition being further characterized by a fast drying time, excellent bonding qualities and the presentation of a good adhesion surface for a wide range of paints and synthetic coatings, said primer composition as applied to the steel comprising a mixture of:
   a. a resinous material consisting essentially of a prepolymerized, self-curing phenoxy resin mixed with a minor amount of thermoplastic, catalytically polymerized hydrocarbon resin selected from the group consisting of aromatic petroleum resins and terpene phenolic resins;
   b. aluminum powder having a particle size at least predominantly less than about 325 mesh and present in a weight ratio of from about 1:40 to about 1:1 relative to the resinous material, said aluminum powder serving as a pigment, corrosion inhibitor, electrical conductor, exothermic reactant, and deoxidizer;
   c. an inorganic oxide powder selected from the group consisting of iron oxide, chromium oxide, and mixtures thereof, and serving as a coloring constituent and exothermic reactant;
   d. a fast drying organic solvent-diluent mixture in which said resinous material is completely soluble, the solvent portion of which at least principally comprises an oxygenated organic solvent characterized by a substantially complete absence of unreacted hydroxyl groups;
said aluminum powder being present in an amount rendering a dried coating of the composition sufficiently electroconductive to enable initiation of a rod welding arc therethrough, and said inorganic oxide being present in the amount of at least 20% by weight relative to the aluminum powder to provide substantial exothermic reaction therewith and promote localized primer burn-off when the primer coating is heated by rod welding arc.

19. The composition of claim 18, wherein said resinous material consists essentially of a mixture of phenoxy resin and petroleum resin.

20. The composition of claim 18, wherein said resinous material consists essentially of a mixture of phenoxy resin and terpene phenolic resin.

21. The composition of claim 18, further comprising finely divided mineral powder as an inert filler.

22. The composition of claim 18, further comprising a calcium-amino chromate as a corrosion inhibitor.

23. The composition of claim 18, wherein the inorganic oxide powder, serving as a coloring constituent and exothermic reactant, is present at least in an amount sufficient to stoichiometrically react with essentially all of the aluminum powder present.

24. The composition of claim 18, wherein the aluminum powder and resinous material are respectively present in weight ratio of from about 1:40 to 1:1.

25. The composition of claim 24, further comprising finely divided mineral powder as an inert filler.

26. The composition of claim 18, wherein the solvent-diluent is selected from the group consisting of acetone, methyl ethyl ketone, and mixtures thereof, and the diluent is selected from the group consisting of toluene, xylene, and mixtures thereof.

27. The composition of claim 26, wherein the solvent and diluent are present in approximately equal proportions.

* * * * *